UNITED STATES PATENT OFFICE.

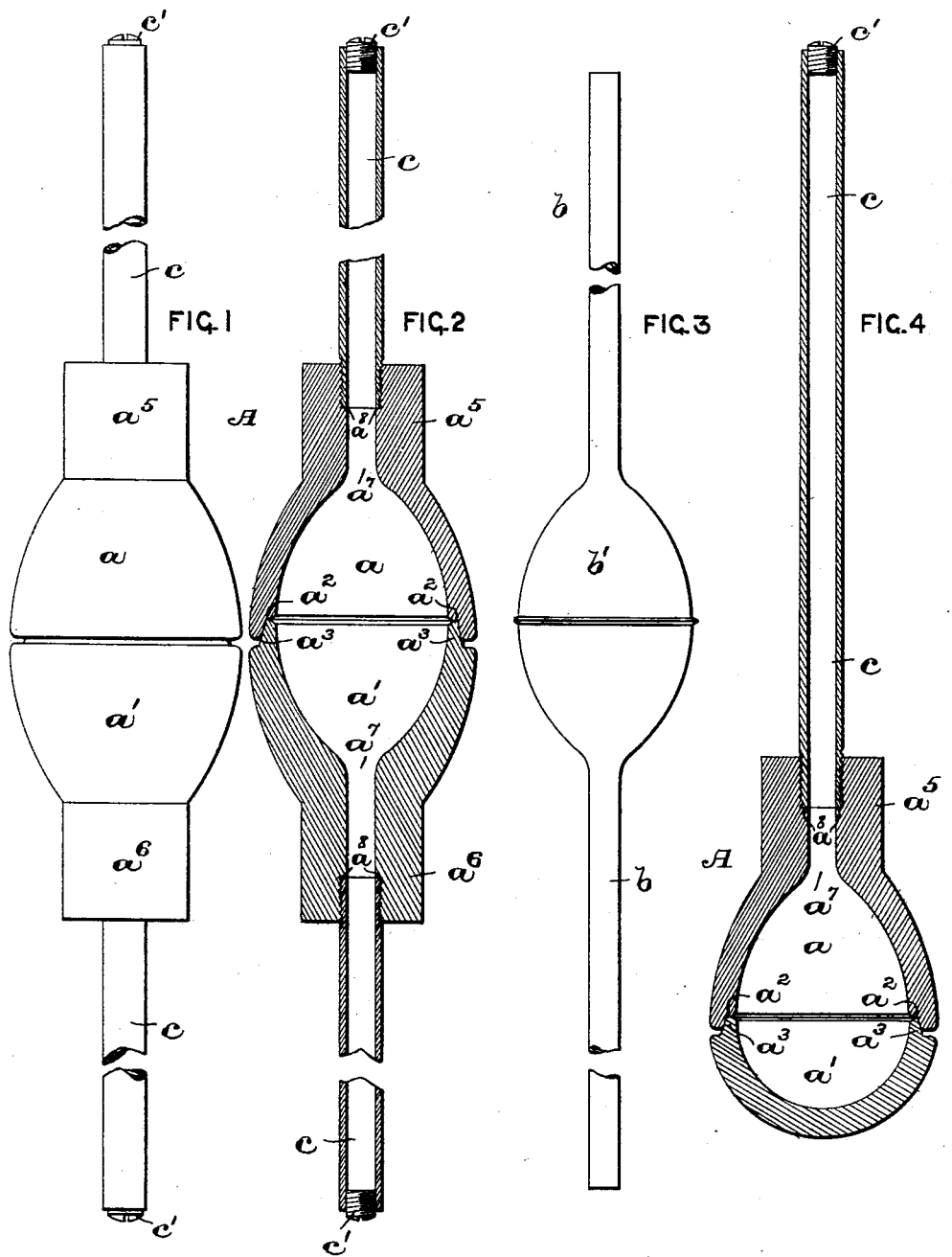

JOHN C. HARDMAN, OF BELLEVILLE, NEW JERSEY.

MOLD FOR VULCANIZING ATOMIZER OR SYRINGE BULBS, &c.

SPECIFICATION forming part of Letters Patent No. 587,961, dated August 10, 1897.

Application filed October 1, 1895. Renewed June 14, 1897. Serial No. 640,758. (No model.)

*To all whom it may concern:*

Be it known that I, JOHN C. HARDMAN, a citizen of the United States, residing at Belleville, in the county of Essex and State of New Jersey, have invented certain new and useful Improvements in Molds for Vulcanizing Atomizer or Syringe Bulbs and Tubing in One Continuous and Seamless Piece; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has for its object to provide an improved mold for the making of atomizer or syringe bulbs and tubing in one continuous and seamless piece, whereby enemas, syringes, or atomizers and other similar articles of rubber can be made stronger, lighter, and less liable to split and to injury to the valve connections heretofore used between the connections of the tubing and the compressible bulb.

As heretofore made syringes or atomizers are provided at the joints of the tubing and compressible bulb with a metal or hard-rubber valve-fitting, said fitting also serving the purpose of securing the end of the separable piece of flexible tubing to the neck of the bulb. To avoid the use of these metallic fittings and to make a cheaper construction of atomizer or syringe, I have devised the novel form of mold for molding and vulcanizing atomizer or syringe bulbs and tubing all in one continuous and seamless piece.

The invention therefore consists of the improved construction of mold to be hereinafter more fully described, and finally embodied in the clauses of the claim.

The invention is illustrated in the accompanying sheet of drawings, in which—

Figure 1 is a front elevation of a mold embodying the principles of my invention for molding and vulcanizing a combined syringe bulb and tubing all in one continuous and seamless piece. Fig. 2 is a longitudinal vertical section of the same, and Fig. 3 is a front elevation of a complete syringe bulb and tubing as made in said mold. Fig. 4 is a longitudinal vertical section of a mold embodying the principles of my invention for molding and vulcanizing an atomizer bulb and tubing all in one continuous and seamless piece.

Similar letters of reference are employed to indicate corresponding parts throughout the several views of the drawings.

In said drawings, A indicates the complete mold, which comprises therein two half-molds $a$ and $a'$, one of which, as $a$, is provided with a recess $a^2$ and the other, $a'$, with a flange $a^3$, whereby the two half-molds can be fitted upon each other, as will be clearly seen from Figs. 2 and 4. When said mold A is to be used in the manufacture of syringe-bulbs, each half-mold $a$ and $a'$ is provided with a neck $a^5$ and $a^6$, respectively, in each of which I form a hole $a^7$ of the proper diameter of the tubing $b$ to be formed on the end or ends of the compressible bulb $b'$. Each hole $a^7$ in said necks $a^5$ and $a^6$ is preferably provided with an offset $a^8$, and into the enlarged portion of said hole $a^7$ is screwed the end of a piece of tubing $c$ of any desirable length and of any suitable metal, preferably aluminium. Instead of screwing said end of the tubing $c$ into said hole $a^7$, the said tubing can be forced into said hole or riveted on or secured to the end of the half-mold in any other well-known manner.

As will be seen from Figs. 2 and 4, the inside diameter of the tube $c$ is the same as the minimum diameter of the hole $a^7$, whereby when the completed article formed in said mold is removed therefrom a bulb having a tube at one or both ends is the result, which are formed in one continuous and seamless piece, as will be clearly understood.

During the process of vulcanizing the atomizer or syringe bulbs and tubing in one continuous and seamless piece the free end of each piece of metal tubing $c$ is closed by a screw-threaded plug $c'$, as shown in the drawings, or said end of the tube $c$ may be closed in any other suitable manner.

When I desire to make a single-neck bulb having a piece of flexible tubing formed integral therewith, I use the form of mold illustrated in Fig. 4, in which one of the necks in one of said half-molds is dispensed with, as will be seen from said figure.

In the manufacture of double-necked or single-necked bulbs having a piece of flexible tubing formed integral with the neck or necks of the bulb without a seam I take a flat piece of rubber and cut it in the proper shape to form the bulb by hand, as now ordinarily done. This roughly-formed bulb has an opening in one end or in both ends, as the case may be, and into these openings I cement the ends of the rubber tubing. I next put water into the said bulb and tubing cemented thereto and then seal up the ends of said tubing. This is then placed into my novel form of mold, inserting the rubber tubing connected with the bulb portion into the tube or tubes $c$, into which said flexible tubing is readily slipped, and the bulb portion is inclosed by the two half-molds $a$ and $a'$, which are then firmly clamped or otherwise fastened together. The mold is then placed in the usual form of heater, and by the action of the hot water and steam generated said bulb portion and flexible tubing are then vulcanized into an atomizer or a syringe bulb and tubing, all formed in one continuous and seamless piece of the proper shape and form shown in said Fig. 3, after which, when the half-molds $a$ and $a'$ are separated, the bulb portion can be readily removed from the said molds, and the tubing, now forming an integral part of the said bulb, is readily withdrawn from the tube $c$.

Thus it will be seen that I can produce a bulb and tubing all in one continuous and seamless piece, thereby dispensing with the metallic or hard-rubber fitting now employed for joining these parts.

It is a well-known fact that in the construction of connecting the tubing to the bulb by means of a metallic or other fitting, in a short time, owing to the loss of the holding power of the rubber, said parts will fit loosely and can be readily pulled apart, thereby rendering the atomizer or syringe useless; but where said bulb and tubing are made integral with each other this cannot happen, the valve-fittings being at the extreme ends of the tubing, where there is less wear upon them. At the same time, should such a fitting become loose, it can be easily removed, a short piece of the end of said tubing cut off, and the fitting can again be securely fitted in place on the end of said tubing.

Having thus described my invention, what I claim is—

1. A mold for vulcanizing atomizer or syringe bulbs and tubing in one continuous and seamless piece, consisting of two separable half-molds, an opening in one or both of said half-molds, and a metallic tube in said opening or openings, substantially as and for the purposes set forth.

2. A mold for vulcanizing atomizer or syringe bulbs and tubing in one continuous and seamless piece, consisting of two separable half-molds, an opening in one or both of said half-molds, a metal tube in said opening or openings, and a plug in the end of said tube, substantially as and for the purposes set forth.

3. A mold for vulcanizing atomizer or syringe bulbs and tubing in one continuous and seamless piece, consisting of two half-molds $a$ and $a'$, a neck $a^5$ on the half-mold $a$, a neck $a^6$ on the half-mold $a'$, a hole in each neck, and a tube $c$ in each hole in said necks, substantially as and for the purposes set forth.

In testimony that I claim the invention set forth above I have hereunto set my hand this 23d day of September, 1895.

JOHN C. HARDMAN.

Witnesses:
FREDK. C. FRAENTZEL,
W. B. FRAENTZEL.